(12) United States Patent
Bednar

(10) Patent No.: US 7,798,242 B2
(45) Date of Patent: Sep. 21, 2010

(54) SHIFT INTERLOCK MECHANISM

(75) Inventor: Richard D. Bednar, Lake Mills, WI (US)

(73) Assignee: Husqvarna Outdoor Products, Inc., Beatrice, NE (US)

( * ) Notice: Subject to any disclaimer, the term of this patent is extended or adjusted under 35 U.S.C. 154(b) by 1267 days.

(21) Appl. No.: 11/347,501

(22) Filed: Feb. 3, 2006

(65) Prior Publication Data

US 2007/0181317 A1    Aug. 9, 2007

(51) Int. Cl.
    *A01B 45/04*    (2006.01)
(52) U.S. Cl. ............................... 172/19; 56/11.7
(58) Field of Classification Search ............ 172/19, 172/20; 56/10.2 E, 10.2 F, 10.5, 10.8, 11.1, 56/11.2, 11.5, 11.7, 11.8, 15.1, 15.2, 15.3, 56/15.9, 16.3, 17.1; 37/241, 244, 345
See application file for complete search history.

(56) References Cited

U.S. PATENT DOCUMENTS

| 3,365,972 | A | 1/1968 | Luke et al. |
| 3,470,771 | A | 10/1969 | Houk |
| 3,498,386 | A | 3/1970 | Daymon |
| 3,597,991 | A | 8/1971 | McCormick, Jr. et al. |
| 3,695,713 | A | 10/1972 | Rothi et al. |
| 3,780,839 | A | 12/1973 | Schroeder |
| 5,009,270 | A | 4/1991 | Vangsgard |
| 5,212,896 | A | 5/1993 | Hillard et al. |
| 5,542,241 | A | 8/1996 | Lydy et al. |
| 5,690,178 | A | 11/1997 | Zehrung, Jr. et al. |
| 6,237,436 | B1 | 5/2001 | Dybro |
| 6,962,209 | B2 | 11/2005 | Isaman et al. |

OTHER PUBLICATIONS

Operator's and Parts Manual, Bluebird Model SC18, Manual No. 8530 Rev. 01 (Jul. 29, 2003).
Drawings from Jacobsen Parts Manual for Rotary Mower, 1980 and description of the drawings.

*Primary Examiner*—Thomas B Will
*Assistant Examiner*—Joel F Mitchell
(74) *Attorney, Agent, or Firm*—Leydig, Voit & Mayer, Ltd.

(57) ABSTRACT

A shift interlock mechanism for automatically shifting a sod cutter into a low gear when a cutting blade is lowered into the ground and automatically raising the cutting blade when the sod cutter is shifted into a high gear. The mechanism may include a cutting blade lever. The cutting blade lever may include a cam member which engages the shift lever creating cam action when the cutting blade handle is raised to the up position. When the cutting blade lever is moved to lower the cutting blade, the cam member moves the shift lever into a low gear. When the cutting blade handle is in the up position and the cutting blade has been lowered, the shift lever will oppose the cam member and create an opposite cam action, thereby raising the blade, when the shifter is moved into a high gear.

52 Claims, 15 Drawing Sheets

SHIFT INTERLOCK MECHANISM

FIELD OF THE INVENTION

The present invention relates to automatic gear shifting, and more particularly to a machine comprising a cutting blade and a shift interlock mechanism to automatically shift the machine into a low gear when the cutting blade is lowered into the ground and to automatically raise the cutting blade when the machine is shifted into a high gear.

BACKGROUND OF THE INVENTION

Modern lawn care equipment significantly simplifies the task of setting up new landscaping, as well as caring for existing lawns. To this end, motorized sod cutters are typically used to ensure a clean look of the lawn by cutting away the unnecessary sod to demarcate the lawn boundaries or to make room for other vegetation, for example.

Typically, a motorized sod cutter comprises a cutting blade mounted on a frame with three or four wheels which are driven by a small engine. To get the sod cutter to the job site, the user may start the engine and use a sod cutter handle to guide the wheels toward the job site. Once at the job site, the user may lower the cutting blade, which is typically connected to a separate cutting blade handle, in order to begin the sod cutting process while guiding the sod cutter along the desired cutting path using the sod cutter handle. The cutter drive powers the cutting blade to assist with the sod cutting process. Motorized sod cutters may also comprise multiple forward speeds. The higher forward speed is typically used as a transport speed to get the sod cutter to the job site more quickly using the assistance of the engine and is not intended to be used when the cutting blade is lowered for sod cutting because the higher speed may not properly cut the sod. The lower forward speed, on the other hand, is intended to be used when the cutting blade is lowered for sod cutting.

Often, the user shifts the sod cutter into the higher forward speed in order to quickly transport the sod cutter to the job site but neglects to shift the sod cutter into a lower speed intended for sod cutting when the cutting blade is lowered. The end result is a poor cut and an overtaxed machine with a decreased reliability, significantly shortened useful life, and increased maintenance costs due to the shortage of cutter drive power necessary to counteract the strength of the sod roots. A similar problem exists when the user is using the cutting blade and shifts to a higher speed intended only for transporting the sod cutter.

Consequently, there is a need for a mechanism which automatically shifts the sod cutter into the appropriate transmission gear when the cutting blade is lowered by the user and automatically raises the cutting blade when the sod cutter is shifted into a high transport gear by the user.

BRIEF SUMMARY OF THE INVENTION

The invention provides a lawn care machine for cutting sod, or a sod cutter which may include a chassis attached to the wheels, which are powered by an engine through a transmission. The transmission may comprise a plurality of low and high gears which are selectable by aligning a shifter with corresponding gear axis positions on the shifter cover. The first and second gears are used for cutting the sod when the cutting blade is lowered into the ground. The cutting blade may be lowered into the ground by raising the cutting blade handle to the up position. Conversely, the cutting blade may be raised by lowering the cutting blade handle toward the down position.

A shift interlock mechanism is provided in order to automatically shift the sod cutter into a low gear when the cutting blade is lowered into the ground and to automatically raise the cutting blade when the sod cutter is shifted into a high gear. The shift interlock mechanism may comprise a cutting blade lever mounted on a cutting blade engagement shaft. The cutting blade lever may include a cam member which engages the shift lever and creates cam action when the cutting blade handle is raised to the up position. When the cutting blade engagement shaft is rotated to lower the cutting blade, the cam member moves the shift lever into a low gear. Similarly, when the cutting blade handle is in the up position and the cutting blade has been lowered, the shift lever will oppose the cam member and create an opposite cam action, thereby raising the blade when the shifter is moved into a high gear.

DETAILED DESCRIPTION OF THE INVENTION

Figure 1:
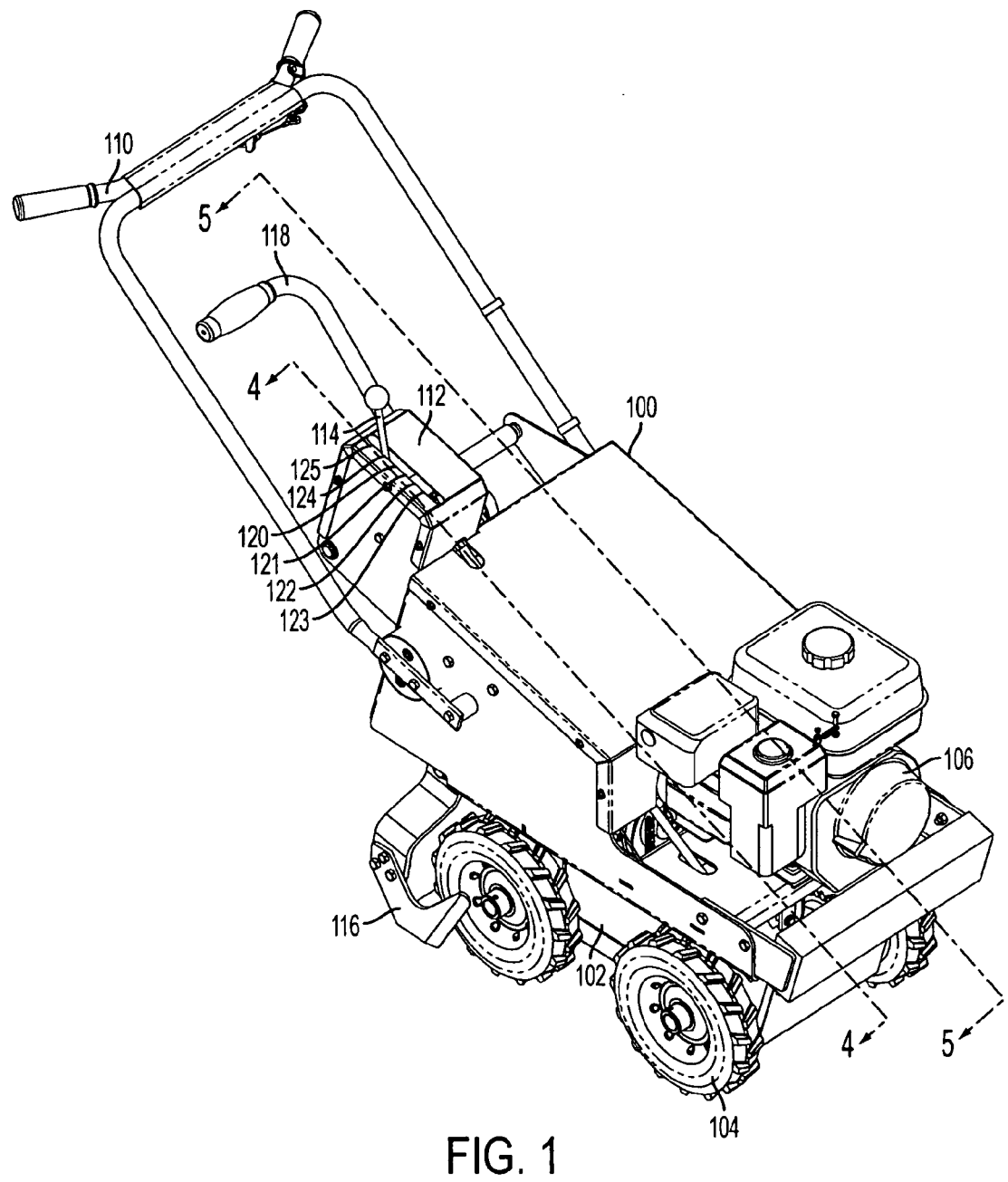
FIG. 1 is a front perspective view of the sod cutter in accordance with one embodiment of the present invention.
Figure 2:
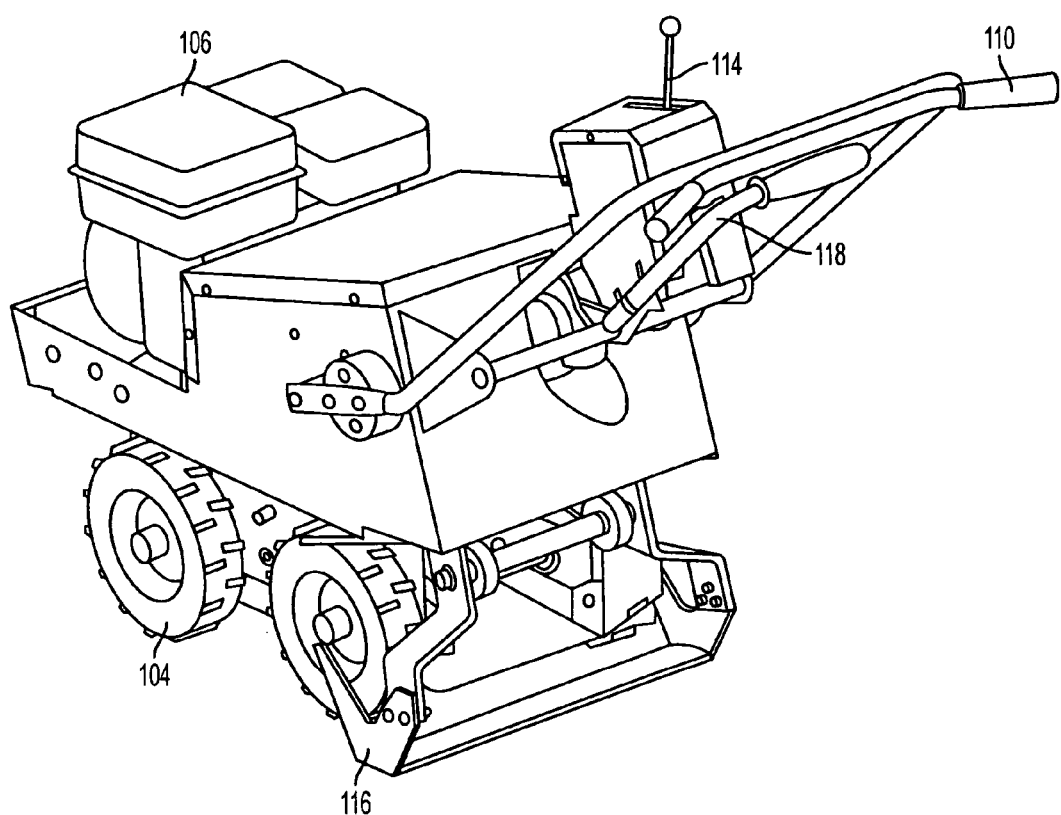
FIG. 2 is a rear perspective view of the sod cutter of FIG. 1.
Figure 5:
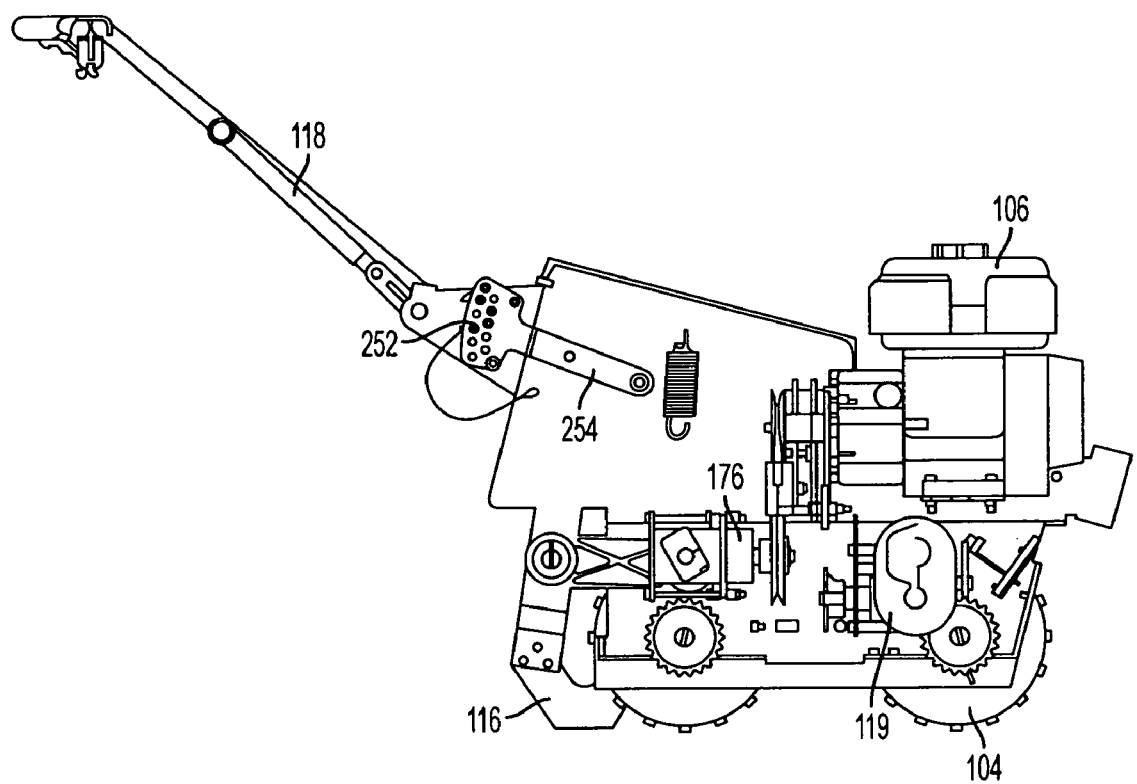
FIG. 5 is a side cross-section view of the sod cutter of FIG. 1 taken along the line 5-5 showing the location of the engine, the gear box, and the transmission linkages.

Turning now to the drawings, there is illustrated in FIG. 1, a lawn care machine for cutting sod, or a sod cutter 100. Referring to FIGS. 1 and 5, to provide motorized mobility, the sod cutter 100 may comprise a chassis 102 attached to wheels 104 which are powered by an engine 106 through a transmission 119. The wheels 104 may comprise 10-inch semi-pneumatic v-tractor tread tires. The chassis 102 may be manufactured from a welded steel frame. A suitable example of an engine 106 may be a 5.5 HP gasoline engine. The sod cutter 100 may be guided along the desired path with the help of frame handles 110.

Referring to FIGS. 1 and 5, to provide increased mobility and maximize the available cutting power, the sod cutter 100 may comprise a four-speed manual transmission 119. In the illustrated embodiment, the transmission 119 may power the wheels 104 through a four-wheel drive system, however, in other embodiments different wheel drive arrangements, such as two-wheel drive, are also possible. The transmission 119 may have a first gear 120, a second gear 121, a third gear 122, a fourth gear 123, as well as a neutral 124 and a reverse 125, which are selectable by aligning the shifter 114 with corresponding gear axis positions on shifter cover 112. In the illustrated embodiment, the first and second gears 120 and 121 are used for cutting the sod when the cutting blade 116 is lowered into the ground by raising the cutting blade handle 118. The cutting blade 116 is powered through a gearbox 176 which is connected to engine 106 as shown in FIG. 5. The first gear 120 and second gear 121 may provide lower speed and higher torque than the third gear 122 and the fourth gear 123. The second gear 121 is used under normal cutting conditions, while the first gear 120 may be used in order to avoid stalling the engine 106 when extra torque is required for dense sod cutting. Third and fourth gears 122 and 123, however, engage higher speed ratios in order to provide faster transport speeds to and from a job site, while decreasing the amount of torque provided to the wheels 104. Consequently, third and fourth gears 122 and 123 are not meant to be used when the cutting blade 116 is lowered for sod cutting because the higher ground speed may not properly cut the sod.

Neutral 124 may be used to disengage the wheel drive in order to manually push the sod cutter 100 without the assistance of the engine 106. For example, the neutral position may be used to maneuver the sod cutter in a storage location or on a trailer. Reverse gear 125 may be used to back off of trailers which may be used to transport the sod cutter 100 to the job site. Reverse gear 125 may also be used when cutting sod around trees where the cutting blade 116 can cut under the tree roots. The blade 116 can not be lifted out of the ground because the roots are holding it down. In such a situation, one way to free the sod cutter 100 is to reverse the sod cutter out of the reach of the roots.

Figure 7:
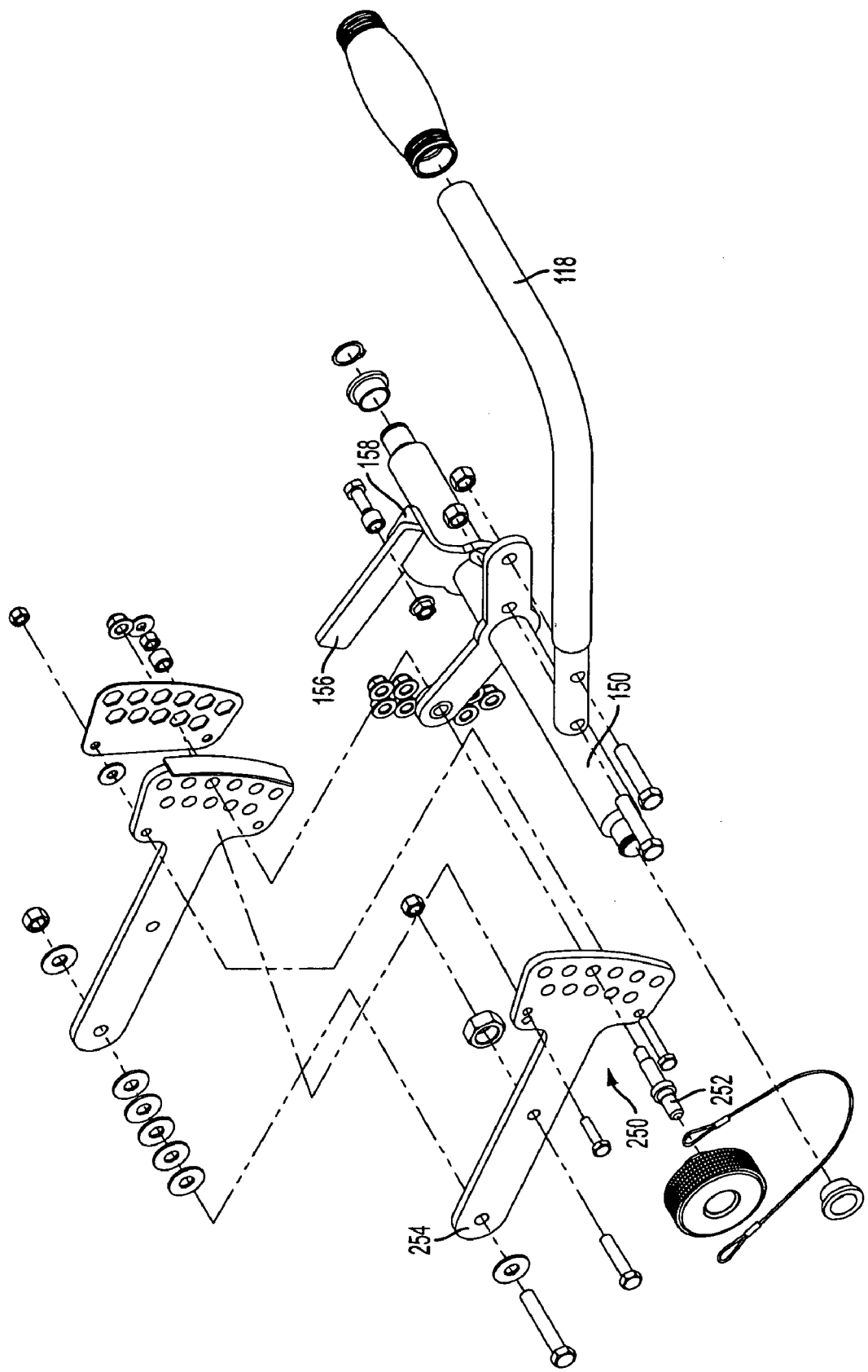
FIG. 7 is an exploded view of the cutting blade handle assembly showing the cutting blade lever and the cam member of the cutting blade lever.

To allow the operator to adjust the height of the cutting blade 116, a height adjustment mechanism 250 is provided, as illustrated in FIG. 7. The height adjustment mechanism 250 may comprise a multiple hole adjuster plate 254 capable of receiving the adjuster stud 252 to adjust the mounting height of the cutting blade 116.

Figure 8:
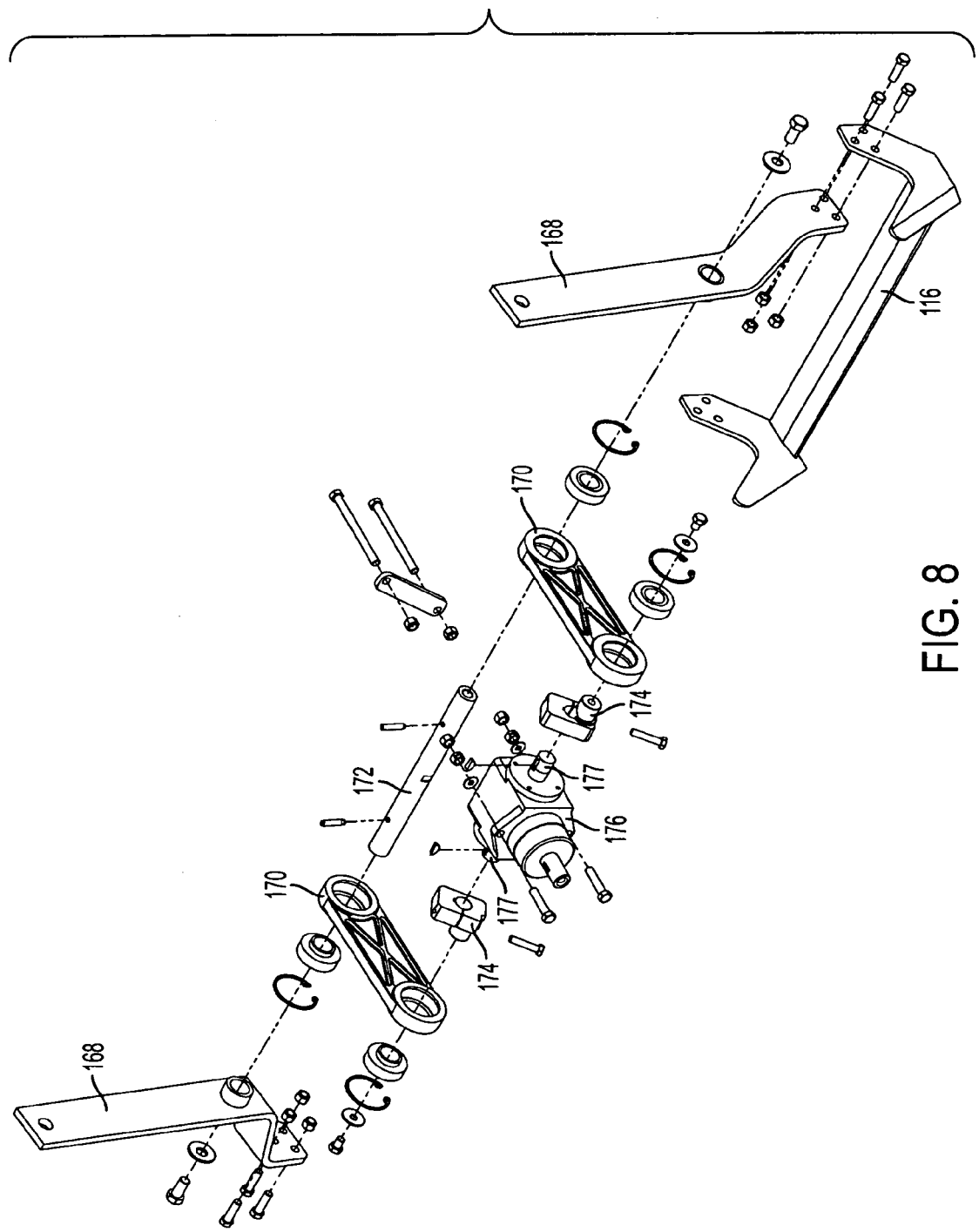
FIG. 8 is an exploded view of the cutting blade drive assembly.

To provide the necessary rate of oscillation, the cutting blade 116 may be powered through the gear box 176 which is connected to the engine 106, as illustrated in FIGS. 5 and 8. Referring to FIG. 8, the gear box shafts 177 are pivotally connected to eccentric members 174. The eccentric members 174 effectuate the oscillatory motion of the cutting blade 116 through the connecting links 170 which are pivotally connected to the eccentric members 174 at a first end and to the blade arm shaft 172 and the blade arms 168 at a second end.

Figure 3:
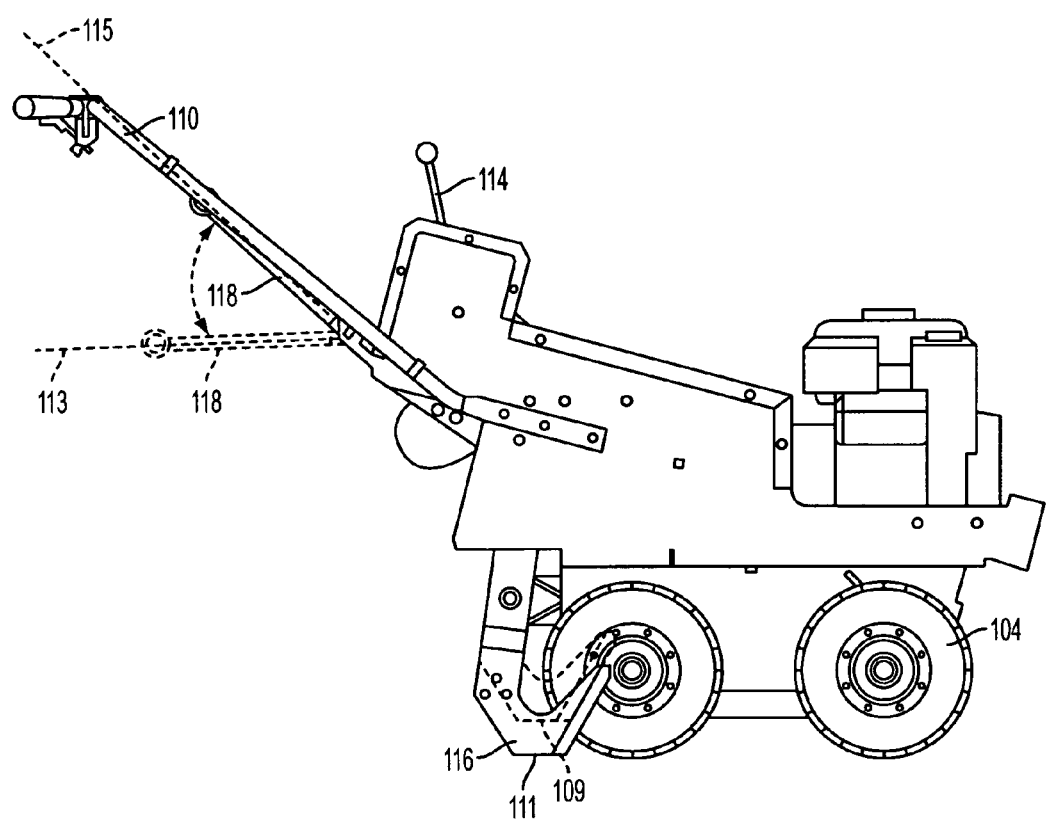
FIG. 3 is a side elevation view of the sod cutter of FIG. 1.
Figure 4:
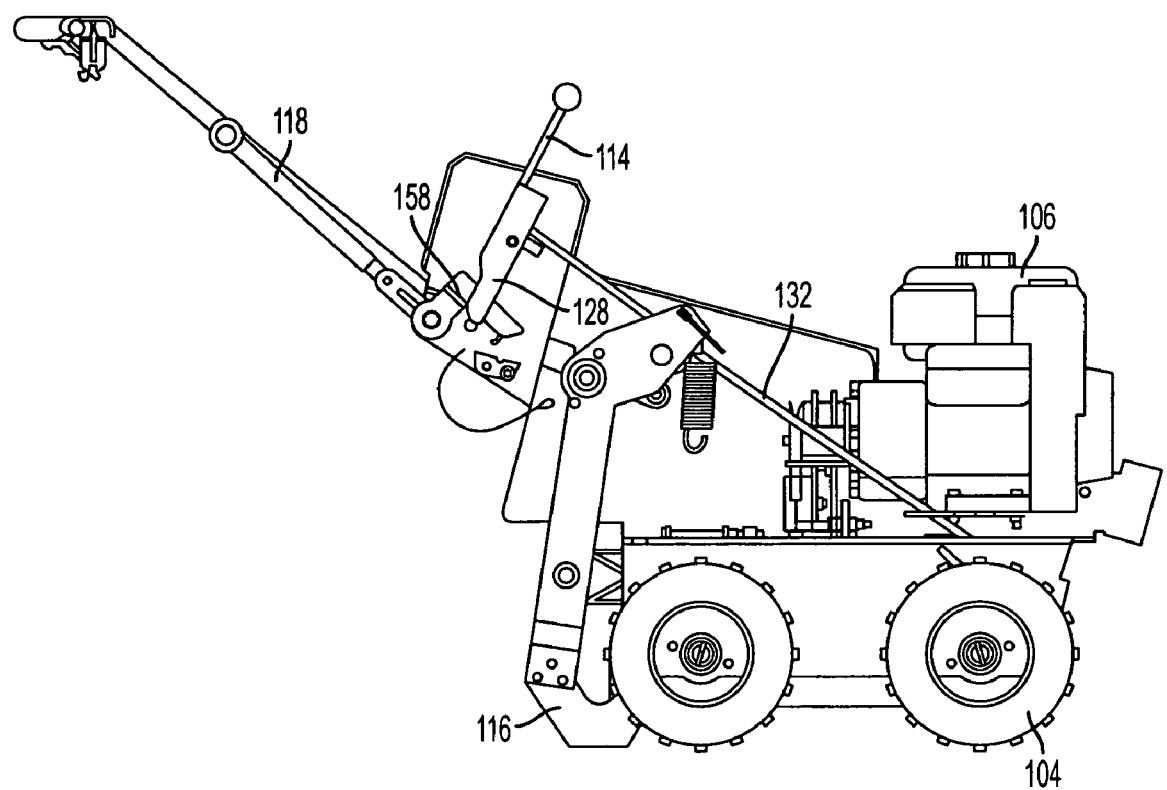
FIG. 4 is a side cross-section view of the sod cutter of FIG. 1 taken along the line 4-4 showing the location of the shifter, the shift rod, and the engine, where the shifter is located in the second gear axis position.

Referring to FIG. 3, the cutting blade 116 may be engaged, or lowered to position 111, by raising the cutting blade handle 118 to the up position 115. Conversely, the cutting blade 116 may be disengaged, or raised to position 109, by lowering the cutting blade handle 118 toward the down position 113.

Figure 6:
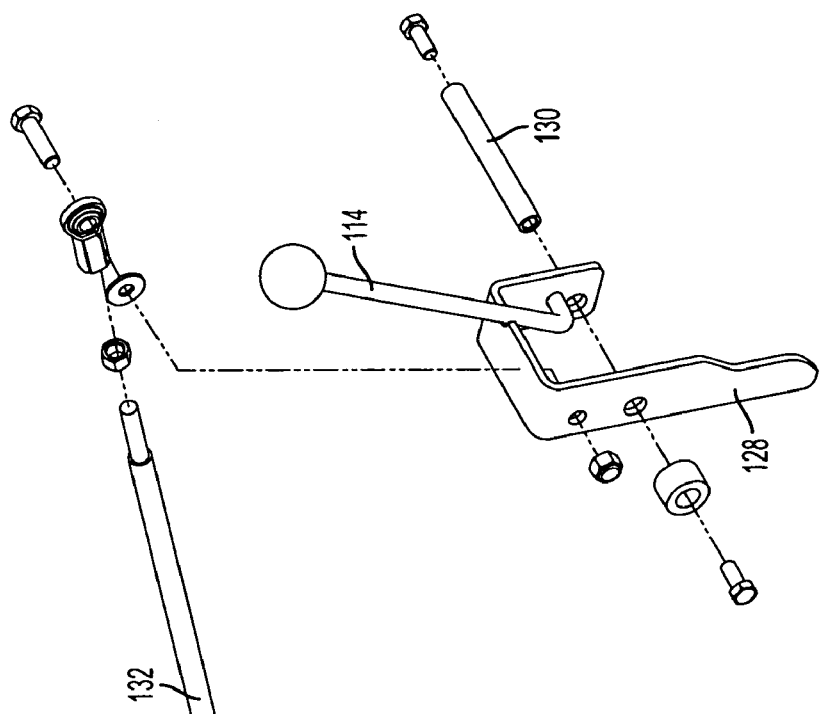
FIG. 6 is an exploded view of the shifter assembly.
Figure 6:
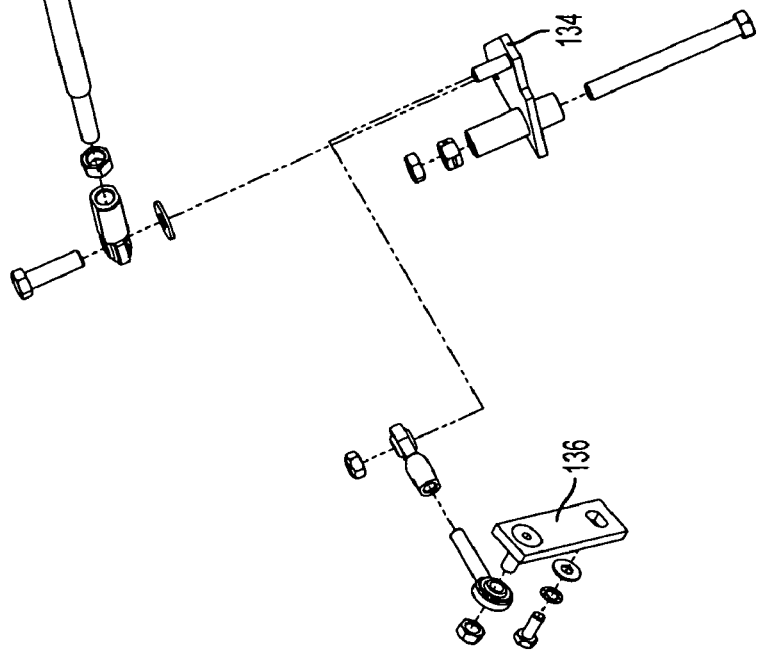

As illustrated in FIG. 6, gear selection is accomplished by pivoting the shift lever 128, by using the shifter 114, along the axis of a shift pivot shaft 130. Hence, the gear change is accomplished by the transmission shift arm 136 which is connected to the shift lever 128 through the shift bell crank 134 and shift rod 132.

Figure 9:
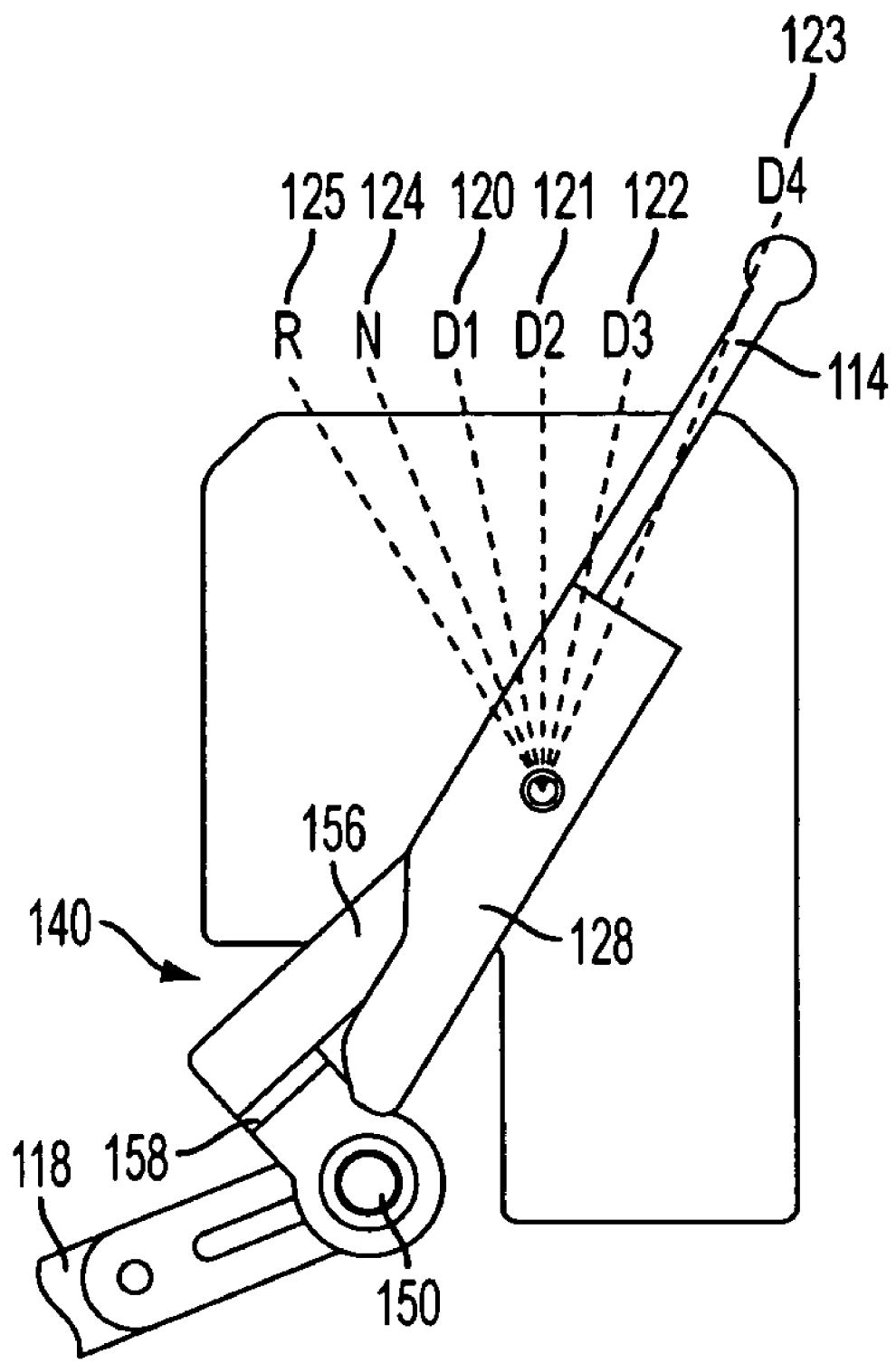
FIG. 9 is a side elevation view showing the relative positions of the shift lever and the cam member when the shifter is in the fourth gear and the cutting blade handle is lowered.
Figure 11:
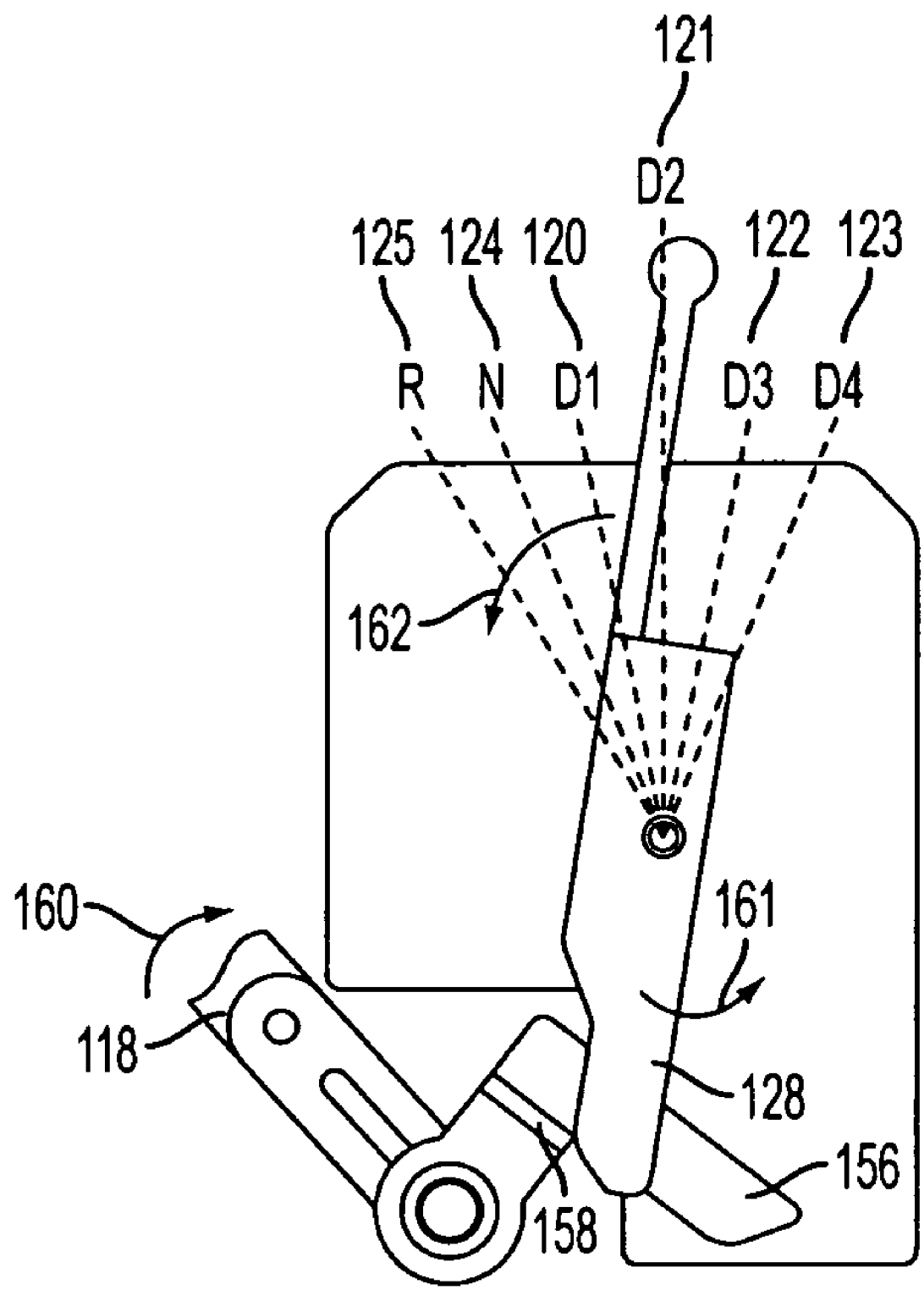
FIG. 11 is a side elevation view showing the cam action between the shift lever and the cam member when the cutting blade handle is raised to lower the cutting blade and the shifter is forced into the second gear.
Figure 12:
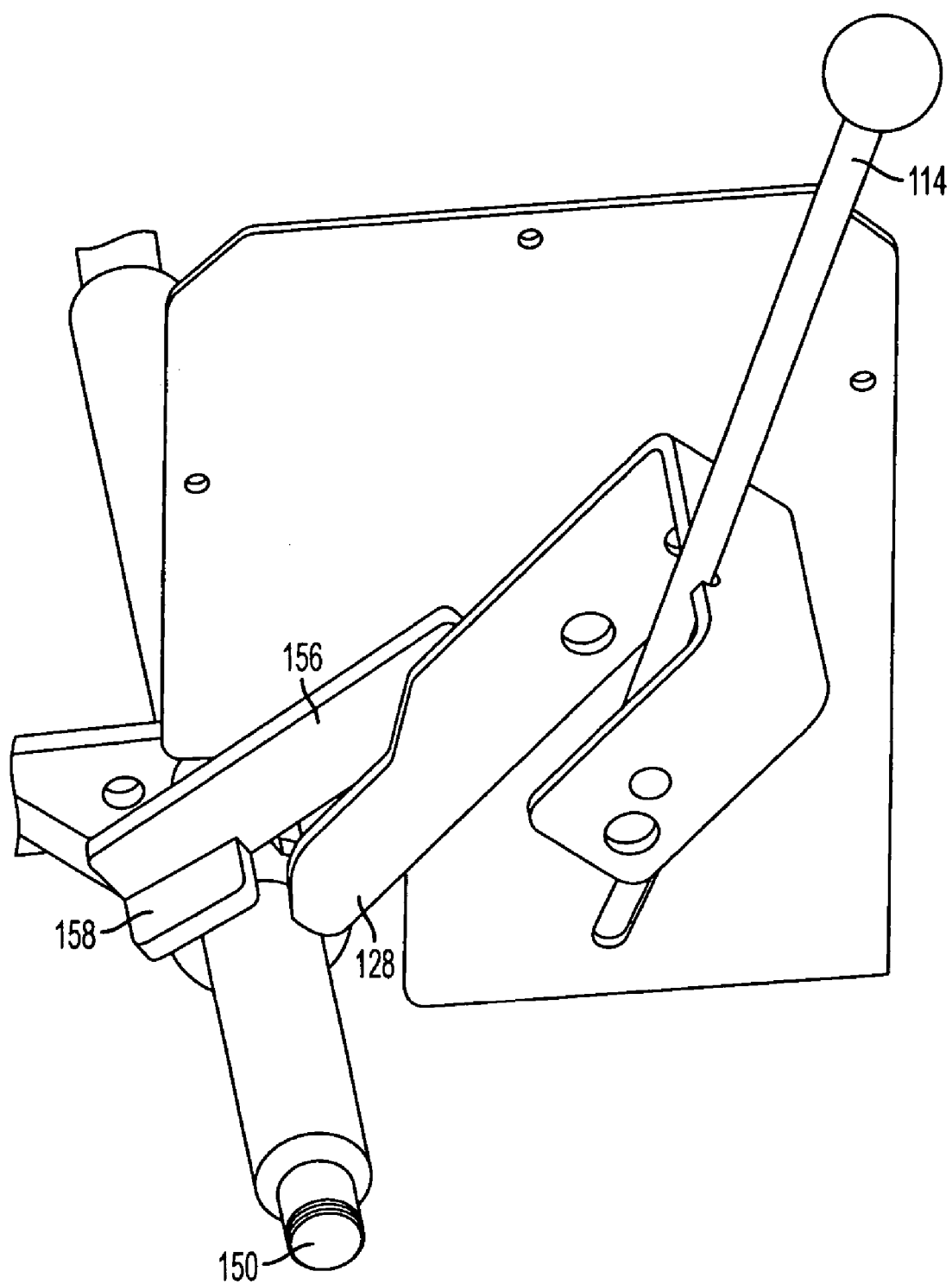
FIG. 12 is a top perspective view of the shift interlock mechanism shown in FIG. 9.

In order to automatically shift the sod cutter 100 into a low gear when the cutting blade 116 is lowered into the ground and to automatically raise the cutting blade 116 when the sod cutter 100 is shifted into a high gear, a shift interlock mechanism 140 is provided. As illustrated in FIGS. 7 and 9, the shift interlock mechanism 140 may comprise a cutting blade lever 156 mounted on a cutting blade engagement shaft 150. The cutting blade lever 156 may further comprise a cam member 158 which engages the shift lever 128 and creates cam action when the cutting blade handle 118 is raised to the up position. Referring to FIG. 9, when the cutting blade engagement shaft 150 is rotated to lower the cutting blade 116, cam member 158 moves the shift lever 128 into a low gear as shown in FIG. 11. Similarly, when the cutting blade handle 118 is in the up position and the cutting blade 116 has been lowered, as shown in FIG. 13, the shift lever 128 will oppose the cam member 158 and create an opposite cam action, thereby raising the blade 116 when the shifter 114 is moved into a high gear as shown in FIG. 14.

Figure 10:
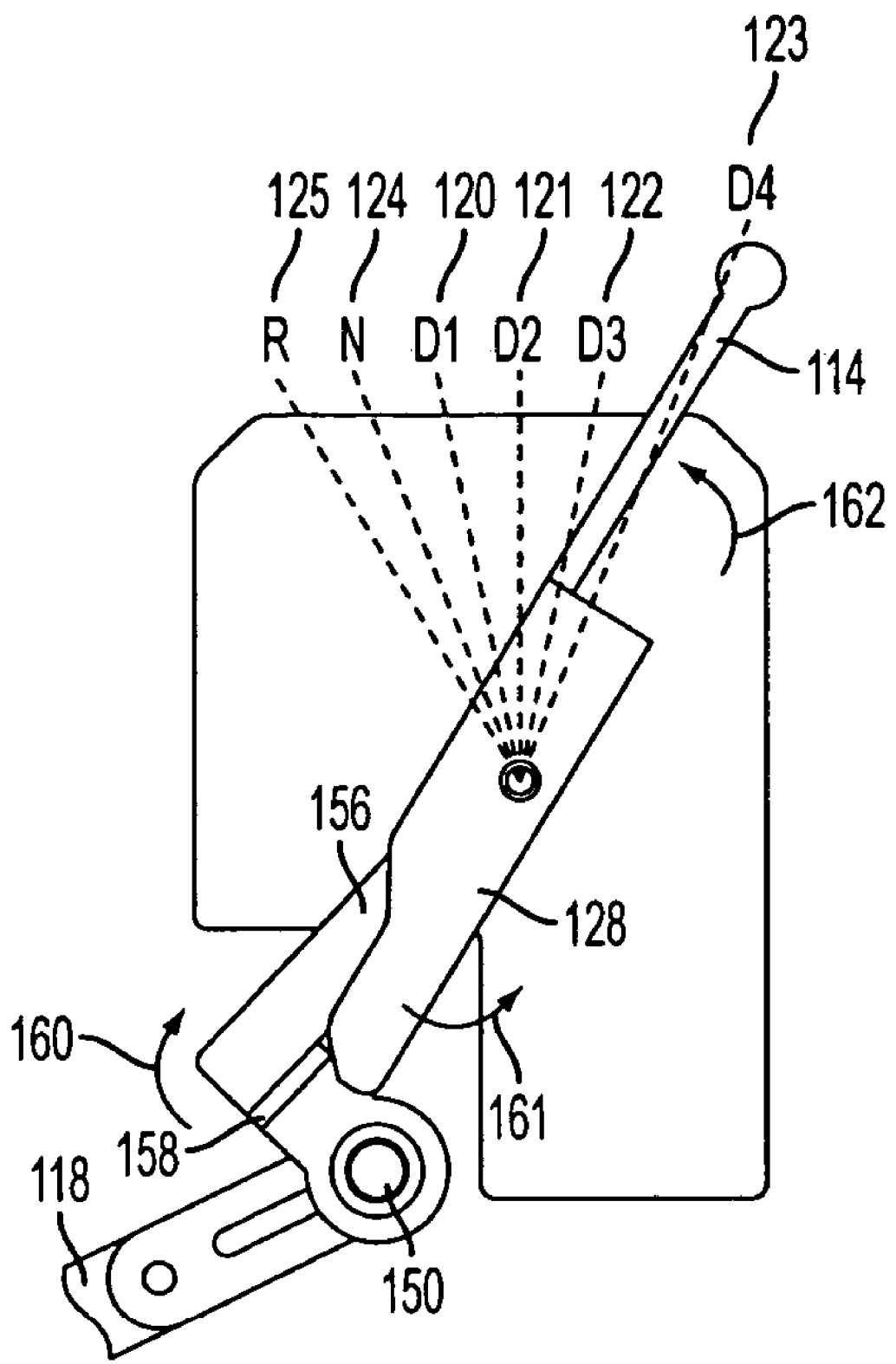
FIG. 10 is a side elevation view showing the engagement of the shift lever and the cam member when the cutting blade handle is being raised and the shifter is in the fourth gear.

The sequence of FIGS. 9-11 illustrates the cam action between the cam member 158 and the shift lever 128 which results when the cutting blade 116 is lowered by raising the cutting blade handle 118 while the shifter 114 is in high gear axis positions 122 or 123, representing the third and fourth gears respectively. FIG. 9 shows the relative positions of the shift lever 128 and the cam member 158 when the shifter 114 is initially in a fourth gear axis position 123 and the cutting blade handle 118 is lowered (hence, the cutting blade 116 is raised). At this position, the cam member 158 of cutting blade lever 156 does not engage the shift lever 128.

FIG. 10 shows the relative positions of the shift lever 128 and the cam member 158 when the cutting blade lever is being raised to the up position while the shifter 114 remains in the fourth gear axis position 123. At this point, the cutting blade handle 118 is being raised and is being rotated in direction 160 to the position where the cam member 158 has started to engage the shift lever 128 and creates the cam action between the cam member 158 and the shift lever 128. Rotating the cutting blade handle 118 in direction 160, in turn rotates the cutting blade lever 156 along with the cam member 158. The cam member 158 opposes the shift lever 128 and causes the shift lever 128 to pivot in direction 161. Therefore, the shifter 114 is being moved in direction 162. FIG. 11 illustrates the final position of the cutting blade handle 118, the shift lever 128, and the shifter 114 when the cutting blade handle 118 has been moved to the up position. The cam member 158 of the cutting blade lever 156 engages the shift lever 128 and moves the shifter 114 into a second gear axis position 121 by creating cam action between the cam member 158 and the shift lever 128. The same action will be achieved if the shifter 114 is initially in the third gear axis position 122. Therefore, when the cutting blade 116 is lowered (by raising the cutting blade handle 118) while the sod cotter 100 is in a fourth gear 123 or in a third gear 122, the resulting cam action between the cam member 158 of the cutting blade lever 156 and the shift lever 128 will automatically move the shifter 114 into the second gear 121.

Figure 13:
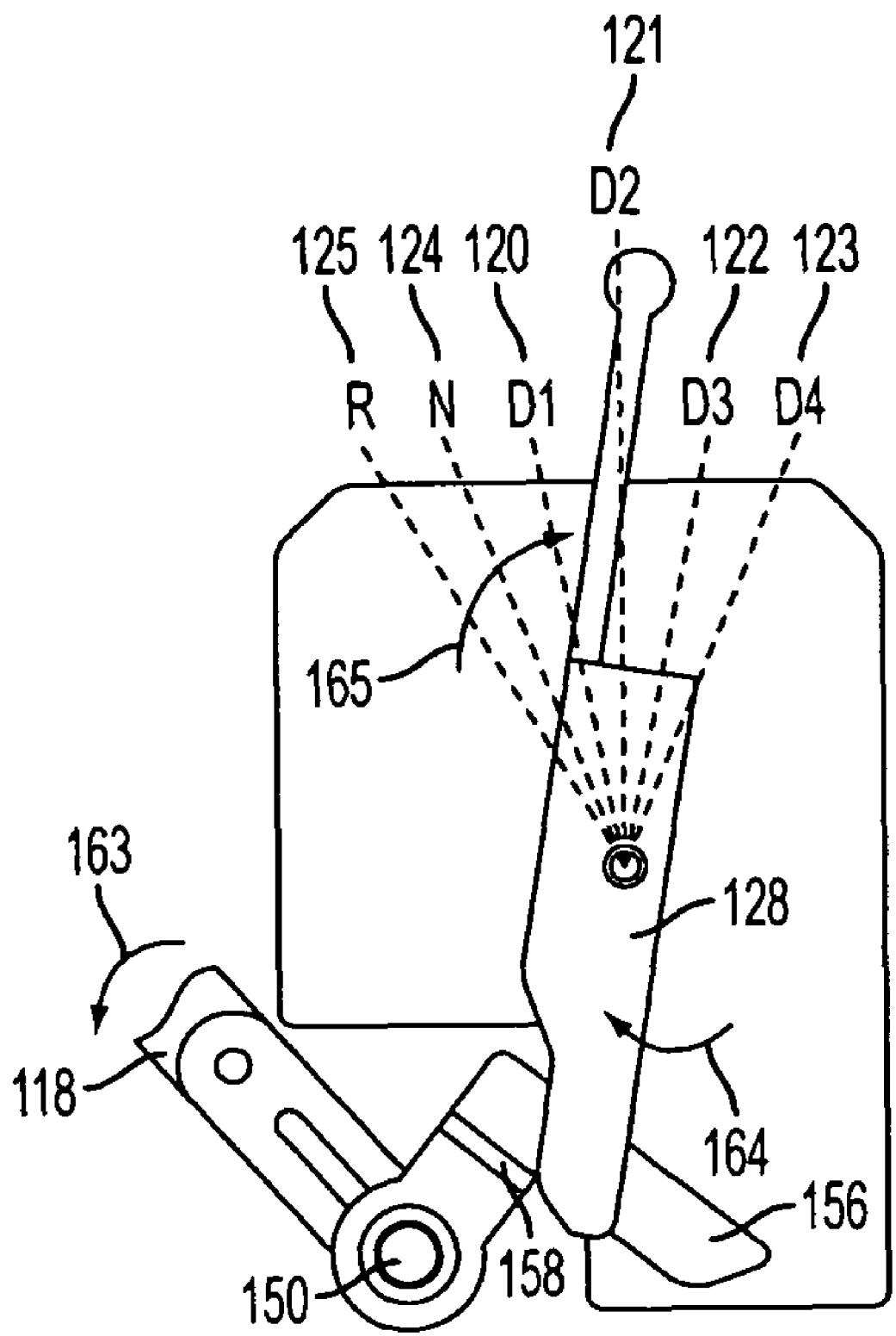
FIG. 13 is a side elevation view showing the relative positions of the shift lever and the cam member when the cutting blade handle is raised (cutting blade lowered) and the shifter is in the second gear.
Figure 14:
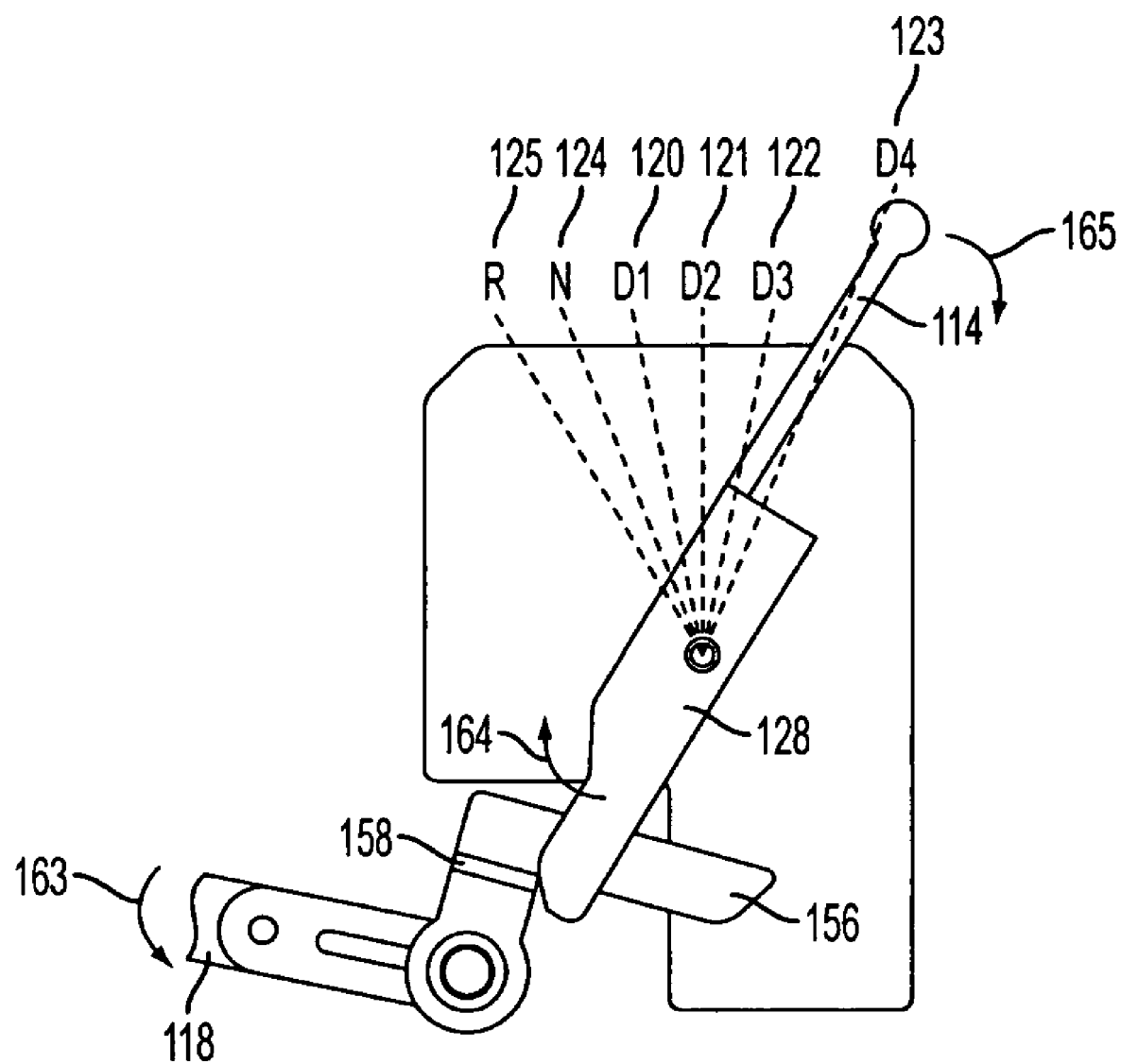
FIG. 14 is a side elevation view showing the cam action between the shift lever and the cam member when the shifter is moved into the fourth gear while cutting blade is lowered, thus automatically lowering the cutting blade handle and raising the cutting blade.
Figure 15:
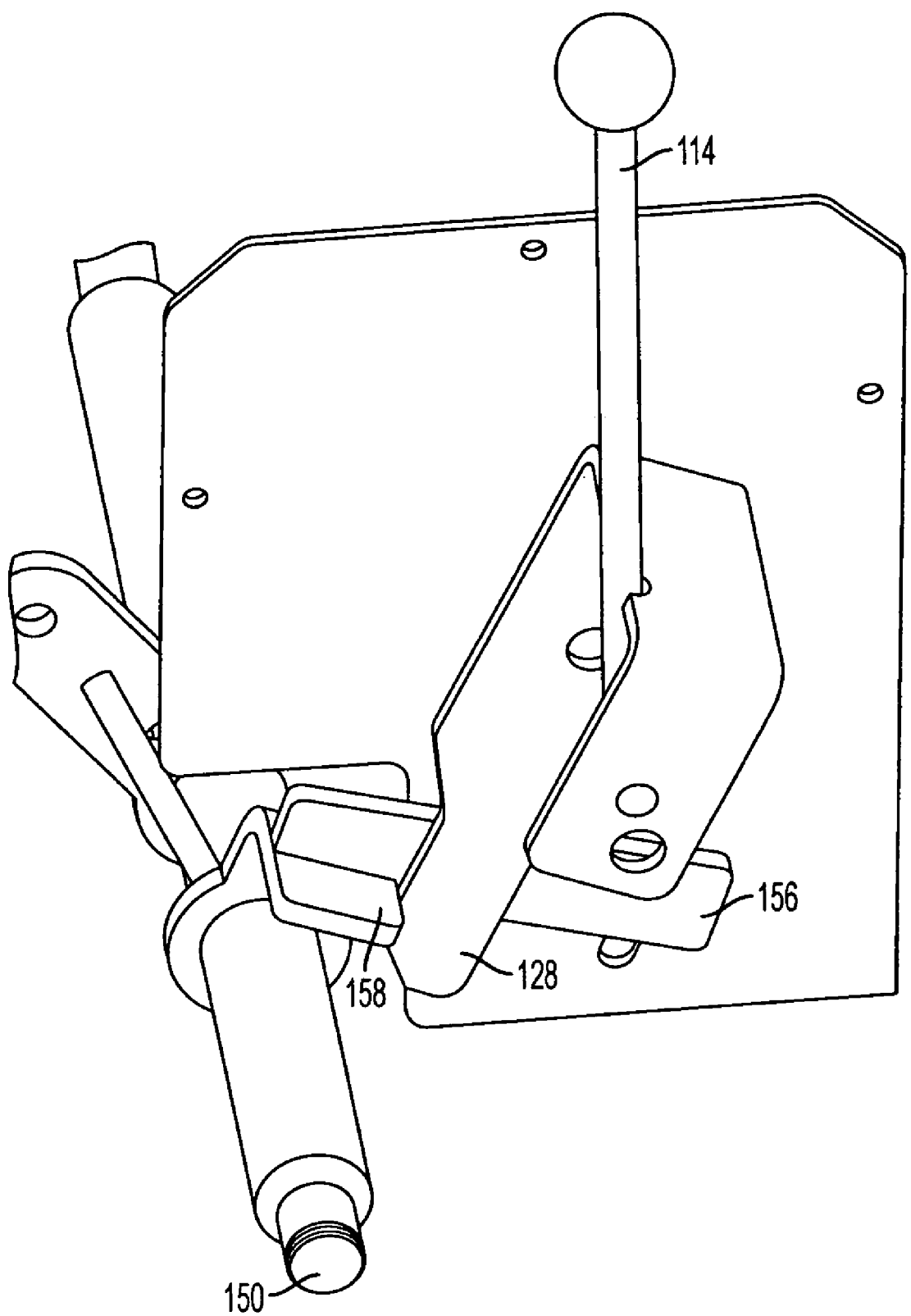
FIG. 15 is a top perspective view of the shift interlock mechanism shown in FIG. 11.

The next sequence of FIGS. 13 and 14 illustrates the reverse cam action between the cam member 158 of the cutting blade lever 156 and the shift lever 128, which results when the shifter 114 is moved from first gear axis position 120 or second gear axis position 121 to third gear axis position 122 or fourth gear axis position 123 while the cutting blade 116 has been in its lowered position. Specifically, FIG. 13 shows the initial relative positions of the cam member 158 and the shift lever 128 when the shifter 114 is in the second gear axis position 121 and the cutting blade handle 118 is in its up position (hence the cutting blade 116 is lowered). In this position, the user may operate the sod cotter 100 without concern for the increased operating stress on the machine because sod cutter 100 is in one of the low gears intended to operate the cutting blade 116. However, as illustrated in FIGS. 13 and 14, when the user attempts to shift into a high gear, such as a third gear axis position 122 or a fourth gear axis position 123, by moving the shifter 114 in direction 165, the shift lever 128 moves in direction 164 and the shift lever 128 engages the cam member 158 to create cam action. The cam action moves the cutting blade handle 118 in direction 163 to be lowered, thus automatically raising the cutting blade 116. This action moves the cutting blade 116 to the raised position if the operator attempts to select an inappropriate gear, such as, in this embodiment, a third gear or a fourth gear.

Therefore, there has been provided a shift interlock mechanism which automatically shifts the sod cutter into a low gear when the cutting blade is lowered and automatically raises the cutting blade when the sod cutter is shifted into a high gear. It should be understood, however, that a shift interlock mechanism is not limited to the embodiment described herein and may be based on other ground engaging tools.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A walk behind-type motorized sod harvester comprising:
    a chassis;
    a handle operatively attached to the chassis for guiding the sod harvester;
    a tool mounted to a lower portion of the chassis and adapted to be engaged for performing sod cutting operations and adapted to be disengaged for transporting the harvester;
    an engine operatively mounted on the chassis to power at least one wheel drivingly coupled through a transmission, the transmission and the at least one wheel being operatively mounted on the chassis;
    the transmission comprising at least one high gear adapted to transport the harvester and at least one low gear adapted to be operable when the tool is engaged; and
    a shift interlock mechanism, the shift lock mechanism having a lever connected to the tool and a cam member wherein the shift lock mechanism is adapted to automatically shift the harvester into the at least one low gear when the tool is engaged while the transmission is in the at least one high gear.

2. The sod harvester of claim 1 wherein the shift interlock mechanism is adapted to automatically disengage the tool when the harvester is shifted into the at least one high gear while the tool is engaged.

3. The sod harvester of claim 2 wherein the cam member is adapted to engage a shift lever, the shift lever adapted to shift the transmission; and
    wherein the engagement of the cam member and the shift lever creates a reverse cam action between the cam member and the shift lever when the shift lever is moved from the at least one low gear into the at least one high gear while the tool is engaged, the reverse cam action causing the tool to be disengaged.

4. The sod harvester of claim 1 wherein the cam member of the shift interlock mechanism is adapted to engage a shift lever, the shift lever adapted to shift the transmission.

5. The sod harvester of claim 4 wherein the engagement of the cam member and the shift lever creates cam action between the cam member and the shift lever when the tool is engaged while the transmission is in the at least one high gear, the cam action causing the shift lever to shift the transmission into the at least one low gear.

6. The sod harvester of claim 1 wherein the tool is engaged by raising a tool handle and wherein the tool is disengaged by lowering the tool handle.

7. The sod harvester of claim 1 wherein the tool is engaged by lowering the tool.

8. The sod harvester of claim 7 wherein the tool is lowered into the ground.

9. The sod harvester of claim 1 wherein the tool is disengaged by raising the tool.

10. The sod harvester of claim 9 wherein the tool is raised from the ground.

11. The sod harvester of claim 1 wherein the tool is a cutting blade.

12. The sod harvester of claim 1 wherein the transmission further comprises a plurality of low gears and a plurality of high gears.

13. The sod harvester of claim 1 further comprising a four-wheel drive wheel drive arrangement.

14. A walk behind-type motorized sod harvester comprising:
a chassis;
a handle operatively attached to the chassis for guiding the sod harvester;
a tool mounted to a lower portion of the chassis and adapted to be engaged for performing sod cutting operations and adapted to be disengaged for transporting the harvester;
an engine operatively mounted on the chassis to power at least one wheel drivingly coupled through a transmission, the transmission and the at least one wheel being operatively mounted on the chassis;
the transmission comprising at least one high gear adapted to transport the harvester and at least one low gear adapted to be operable when the tool is engaged; and
a shift interlock mechanism, the shift lock mechanism having a lever connected to the tool and a cam member and is adapted to automatically disengage the tool when the sod harvester is shifted into the at least one high gear while the tool is engaged.

15. The sod harvester of claim 14 wherein the shift interlock mechanism is adapted to automatically disengage the tool when the harvester is shifted into the at least one high gear while the tool is engaged.

16. The sod harvester of claim 15 wherein the cam member is adapted to engage a shift lever, the shift lever adapted to shift the transmission; and
wherein the engagement of the cam member and the shift lever creates a reverse cam action between the cam member and the shift lever when the shift lever is moved from the at least one low gear into the at least one high gear while the tool is engaged, the reverse cam action causing the tool to be disengaged.

17. The sod harvester of claim 14 wherein the cam member of the shift interlock mechanism is adapted to engage a shift lever, the shift lever adapted to shift the transmission.

18. The sod harvester of claim 17 wherein the engagement of the cam member and the shift lever creates cam action between the cam member and the shift lever when the tool is engaged while the transmission is in the at least one high gear, the cam action causing the shift lever to shift the transmission into the at least one low gear.

19. The sod harvester of claim 14 wherein the tool is engaged by raising a tool handle and wherein the tool is disengaged by lowering the tool handle.

20. The sod harvester of claim 14 wherein the tool is engaged by lowering the tool.

21. The sod harvester of claim 20 wherein the tool is lowered into the ground.

22. The sod harvester of claim 14 wherein the tool is disengaged by raising the tool.

23. The sod harvester of claim 22 wherein the tool is raised from the ground.

24. The sod harvester of claim 14 wherein the tool is a cutting blade.

25. The sod harvester of claim 14 wherein the transmission further comprises a plurality of low gears and a plurality of high gears.

26. The sod harvester of claim 14 further comprising a four-wheel drive wheel drive arrangement.

27. A method for performing sod cutting operations by a walk behind-type motorized sod harvester:
providing a chassis;
providing a handle operatively attached to the chassis for guiding the sod harvester;
providing a tool mounted to a lower portion of the chassis and adapted to be engaged for performing sod cutting operations and adapted to be disengaged for transporting the harvester;
providing an engine operatively mounted on the chassis to power at least one wheel drivingly coupled through a transmission, the transmission and the at least one wheel being operatively mounted on the chassis;
the transmission comprising at least one high gear adapted to transport the harvester and at least one low gear adapted to be operable when the tool is engaged; and
providing a shift interlock mechanism, the shift lock mechanism having a lever connected to the tool and a cam member wherein the shift interlock mechanism is adapted to automatically shift the harvester into the at least one low gear when the tool is engaged while the transmission is in the at least one high gear.

28. The method of claim 27 wherein the shift interlock mechanism is adapted to automatically disengage the tool when the harvester is shifted into the at least one high gear while the tool is engaged.

29. The method of claim 28 wherein the cam member is adapted to engage a shift lever, the shift lever adapted to shift the transmission; and
wherein the engagement of the cam member and the shift lever creates a reverse cam action between the cam member and the shift lever when the shift lever is moved from the at least one low gear into the at least one high gear while the tool is engaged, the reverse cam action causing the tool to be disengaged.

30. The method of claim 27 wherein the cam member of the shift interlock mechanism is adapted to engage a shift lever, the shift lever adapted to shift the transmission.

31. The method of claim 30 wherein the engagement of the cam member and the shift lever creates cam action between the cam member and the shift lever when the tool is engaged while the transmission is in the at least one high gear, the cam action causing the shift lever to shift the transmission into the at least one low gear.

32. The method of claim 27 wherein the tool is engaged by raising a tool handle and wherein the tool is disengaged by lowering the tool handle.

33. The method of claim 27 wherein the tool is engaged by lowering the tool.

34. The method of claim 33 wherein the tool is lowered into the ground.

35. The method of claim 27 wherein the tool is disengaged by raising the tool.

36. The method of claim 35 wherein the tool is raised from the ground.

37. The method of claim 27 wherein the tool is a cutting blade.

38. The method of claim 27 wherein the transmission further comprises a plurality of low gears and a plurality of high gears.

39. The method of claim 27 further providing a four-wheel drive wheel drive arrangement.

40. A method for performing sod cutting operations by a walk behind-type motorized sod harvester comprising:
providing a chassis;
providing a handle operatively attached to the chassis for guiding the sod harvester;
providing a tool mounted to a lower portion of the chassis and adapted to be engaged for performing sod cutting operations and adapted to be disengaged for transporting the harvester;

providing an engine operatively mounted on the chassis to power at least one wheel drivingly coupled through a transmission, the transmission and the at least one wheel being operatively mounted on the chassis;

the transmission comprising at least one high gear adapted to transport the harvester and at least one low gear adapted to be operable when the tool is engaged; and providing a shift interlock mechanism, the shift lock mechanism having a lever connected to the tool and a cam member and is adapted to automatically disengage the tool when the sod harvester is shifted into the at least one high gear while the tool is engaged.

41. The method of claim 40 wherein the shift interlock mechanism is adapted to automatically disengage the tool when the harvester is shifted into the at least one high gear while the tool is engaged.

42. The method of claim 41 wherein the cam member is adapted to engage a shift lever, the shift lever adapted to shift the transmission; and wherein the engagement of the cam member and the shift lever creates a reverse cam action between the cam member and the shift lever when the shift lever is moved from the at least one low gear into the at least one high gear while the tool is engaged, the reverse cam action causing the tool to be disengaged.

43. The method of claim 40 wherein the cam member of the shift interlock mechanism is adapted to engage a shift lever, the shift lever adapted to shift the transmission.

44. The method of claim 43 wherein the engagement of the cam member and the shift lever creates cam action between the cam member and the shift lever when the tool is engaged while the transmission is in the at least one high gear, the cam action causing the shift lever to shift the transmission into the at least one low gear.

45. The method of claim 40 wherein the tool is engaged by raising a tool handle and wherein the tool is disengaged by lowering the tool handle.

46. The method of claim 40 wherein the tool is engaged by lowering the tool.

47. The method of claim 46 wherein the tool is lowered into the ground.

48. The method of claim 40 wherein the tool is disengaged by raising the tool.

49. The method of claim 48 wherein the tool is raised from the ground.

50. The method of claim 40 wherein the tool is a cutting blade.

51. The method of claim 40 wherein the transmission further comprises a plurality of low gears and a plurality of high gears.

52. The method of claim 40 further comprising a four-wheel drive wheel drive arrangement.

* * * * *